United States Patent
Koyun et al.

(10) Patent No.: US 10,039,001 B2
(45) Date of Patent: Jul. 31, 2018

(54) METHOD FOR SECURED TRANSMISSION OF A DATA OBJECT

(71) Applicants: Ismet Koyun, Worms (DE); Markus Ruppert, Darmstadt (DE)

(72) Inventors: Ismet Koyun, Worms (DE); Markus Ruppert, Darmstadt (DE)

(73) Assignee: KOBIL Systems GmbH, Worms (DE)

( * ) Notice: Subject to any disclaimer, the term of this patent is extended or adjusted under 35 U.S.C. 154(b) by 730 days.

(21) Appl. No.: 14/591,993

(22) Filed: Jan. 8, 2015

(65) Prior Publication Data
US 2018/0183608 A1 Jun. 28, 2018

(30) Foreign Application Priority Data
Jan. 9, 2014 (DE) .................. 10 2014 100 173

(51) Int. Cl.
*H04W 12/02* (2009.01)

(52) U.S. Cl.
CPC .................. *H04W 12/02* (2013.01)

(58) Field of Classification Search
CPC ........ G06Q 10/10; G06Q 50/18; G06Q 30/02; G06Q 30/06; G06Q 50/01; G06F 21/30; G06F 11/1456; G06F 11/1458; G06F 21/33; G06F 21/606; G06F 21/608; G06F 21/62; G06F 21/6218; G06F 2221/2115; G06F 21/64; G06F 19/321; G06F 19/322; G06F 19/328; G06F 21/10; G06F 21/32; H04W 12/06; H04W 12/04; H04W 4/008; H04W 12/10; G07B 15/00; G07C 9/00007; G07F 7/1008
See application file for complete search history.

(56) References Cited

U.S. PATENT DOCUMENTS

| | | | |
|---|---|---|---|
| 6,061,448 A | 5/2000 | Smith et al. | |
| 2003/0147536 A1 | 8/2003 | Andivahis et al. | |
| 2008/0086646 A1 | 4/2008 | Pizano | |
| 2008/0091736 A1* | 4/2008 | Sawayanagi | G06F 21/606 |
| 2009/0217027 A1 | 8/2009 | Ayalon | |
| 2010/0266129 A1* | 10/2010 | Tsuchiya | H04L 63/0428 |
| | | | 380/278 |

(Continued)

FOREIGN PATENT DOCUMENTS

WO    WO 01/97432 A2    12/2001

OTHER PUBLICATIONS

Detlef Hühnlein, et al., Principles of Electronic Signature (Grundlagen der elektronischen Signatur), Federal Office for Security in Information Technology (Bundesamt für Sicherheit in der Informationstechnik), Mar. 2006, Bonn, Germany.

*Primary Examiner* — Abiy Getachew
(74) *Attorney, Agent, or Firm* — Reinhart Boerner Van Deuren P.C.

(57) ABSTRACT

A method is disclosed comprising receiving identification information on an addressee, to whom an encrypted data object is sent by a transmission device or for whom the encrypted data object is to be provided by the transmission device for retrieval, from the transmission device to a server, associating the identification information with a key for decrypting the encrypted data object by the server, sending the key for decrypting the encrypted data object to the addressee by the server, or providing by the server the key for decrypting the encrypted data object for retrieval by the addressee.

25 Claims, 4 Drawing Sheets

(56) References Cited

U.S. PATENT DOCUMENTS

2013/0024686 A1    1/2013  Drucker
2013/0103939 A1*  4/2013  Radpour ................ H04L 9/083
                                                              713/152

* cited by examiner

METHOD FOR SECURED TRANSMISSION OF A DATA OBJECT

CROSS-REFERENCE TO RELATED PATENT APPLICATIONS

This patent application claims priority to German Application No. 10 2014 100 173.7, filed Jan. 9, 2014, the entire teachings and disclosure of which are incorporated herein by reference thereto.

AREA OF THE INVENTION

The present invention relates to, inter alia, a method for protected transmission of a data object.

BACKGROUND TO THE INVENTION

In the prior art, solutions are known for protected transmission of data objects over the internet. One form of protected data transmission is encrypted and/or signed emails. This form of data transmission is commonly used and standardised. However, the preparations for use of this technology are usually very complex, since before actual transmission of the data objects, one or more keys or certificates for encrypting the data must be exchanged between the sender and the addressee. So, in the case of an asymmetric encryption method, first the addressee must give the sender his public key for encrypting the data objects, so that the sender can then encrypt the data objects with the addressee's public key and transmit them in protected form to the addressee. The addressee can then decrypt the encrypted data objects with his private key. This is particularly complex if it does not involve closed user groups (e.g. within an organisation) in which central administration ensures smooth function. Also, in this form of protected data transmission, all data objects to be sent to the addressee are encrypted with the same public key of the addressee. An attacker who hacks the addressee's private key can therefore decrypt all encrypted data objects transmitted to the addressee.

SUMMARY OF SOME EXEMPLARY EMBODIMENTS OF THE PRESENT INVENTION

One object of the present invention is therefore to overcome said disadvantages. In particular, the present invention may also provide a simple possibility for protected transmission of data objects for open user groups which can easily be expanded to new users and with no central administration offer. In an open user group, communication partners, for example, know only the e-mail addresses of each other but nothing more.

This object is achieved by the subject of the main claim and the secondary claims. Advantageous exemplary embodiments of the invention are given in the subclaims.

A first method according to the invention comprises receiving identification information on an addressee, to whom an encrypted data object is to be sent by a transmission device, or for whom the encrypted data object is to be provided by the transmission device for retrieval from a server, associating identification information with a key for decrypting the encrypted data object by the server, and sending the key for decrypting the encrypted data object to the addressee by the server or providing by the server the key for decrypting the encrypted data object for retrieval by the addressee.

A second method according to the invention comprises encrypting a data object by a transmission device such that it can be decrypted with a key for decrypting the encrypted data object, sending identification information on an addressee of the encrypted data object by the transmission device to a server, and the sending the encrypted data object by the transmission device to the addressee or providing by the transmission device the encrypted data object for retrieval by the addressee.

A third method according to the invention comprises obtaining of an encrypted data object at a receiver device, receiving a key for decrypting the encrypted data object from a server at the receiver device, and decrypting the encrypted data object by the receiver device.

A fourth method according to the invention for protected transmission of a data object comprises the steps of the first method according to the invention which, for example, run on a server, the steps of the second method according to the invention which, for example, run on a transmission device, and the steps of the third method according to the invention which, for example, run on a receiver device. The steps of the first, second and third methods according to the invention should thus preferably be understood as corresponding steps of the fourth method according to the invention for protected transmission of an encrypted data object, which, for example, could run in a system comprising the server, the transmission device and the receiver device.

For example, the methods according to the invention each concern the same server, the same transmission device and the same receiver device. The transmission device, the receiver device and the server are, for example, separate data processing systems. Preferably, the transmission device is a transmission device according to the invention, the receiver device is a receiver device according to the invention, and the server is a server according to the invention.

The data object of the first method according to the invention corresponds, for example, to the data object of the second and third methods according to the invention. The data object may, for example, contain confidential information which is to be transmitted from a sender to the addressee (i.e. sent to the addressee or provided for retrieval by the addressee). The data object is, for example, a message. The sender is, for example, a user of the transmission device, and the addressee is, for example, a user of the receiver device. For example, the sender causes the transmission device to send the encrypted data object to the addressee or provide this for retrieval by the addressee. For example, the addressee causes the receiver device to receive the encrypted data object.

The encrypted data object may be sent by the transmission device to the addressee at least partially via a network or several networks, or be provided for retrieval by the addressee at least partially via a network or several networks. Examples of a network are a local area network (LAN) such as an Ethernet network or an IEEE 802 network, a wide area network (WAN), a wireless network, a hard-wired network, a mobile telephone network, a telephone network and/or the internet.

Sending an encrypted data object by the transmission device to the addressee is to be understood to mean, for example, that the encrypted data object is sent to the addressee such that the latter can receive this on the receiver device. In particular, sending the encrypted data object by the transmission device to the addressee is to be understood to mean, for example, that the encrypted data object is sent as part of an electronic message from the transmission device via a network to the electronic message address of the addressee, and/or that the encrypted data object is transmitted in one or more data packets. Examples of an electronic message are an e-mail, a DE-mail, a short message such as SMS and MMS, and/or a message sent via a so-called messenger service such as WhatsApp and Skype. Examples of a data packet are a TCP segment and/or an IP datagram.

Providing by the transmission device the encrypted data object for retrieval by the addressee is to be understood to mean, for example, that the encrypted data object is provided for retrieval by the addressee, such that the latter can receive this at the receiver device. In particular, providing the encrypted data object for retrieval by the addressee is to be understood to mean, for example, that the transmission device provides the encrypted data object for downloading via a network, that the transmission device transmits the encrypted data object via a network to a download server (e.g. a download server of a Cloud service such as Dropbox and Rapidshare), wherein the download server provides the encrypted data object for downloading via a network, and/or that the transmission device provides the encrypted data object on a data carrier (e.g. a DVD, diskette, portable hard disk, exchangeable data carrier and/or portable memory stick).

Obtaining the encrypted data object by the receiver device is to be understood to mean, for example, that the encrypted data object is downloaded by the receiver device from the transmission device or a download server via a network, that the encrypted data object is received as part of an electronic message at the receiver device via a network, and/or that the encrypted data object is read from a data carrier into the receiver device. For example, the addressee causes the receiver device to obtain the encrypted data object.

To protect the data object and/or the information contained in the data object on the transmission route from the transmission device to the receiver device (e.g. in the network), the transmission device encrypts the data object before sending or before providing for retrieval. For example, the data object may be encrypted with a symmetric, hybrid or asymmetric encrypion method, such that it is only decryptable with a key for decrypting the encrypted data object. Examples of an encryption method are encryption methods following the PKCS#7 standard, the S/MIME standard and/or the PGP standard.

The key for decrypting the encrypted data object of the first method according to the invention corresponds, for example, to the key for decrypting the encrypted data object of the second and third methods according to the invention.

The identification information of the first method according to the invention corresponds, for example, to the identification information of the second method according to the invention. For example, the identification information allows identification of the addressee by the server, authentication of the addressee by the server, and/or contact with the addressee by the server. The identification information contains, for example, an electronic message address of the addressee (e.g. an e-mail address or DE-mail address of the addressee), an identification number of the addressee (e.g. a customer number or a registration number of the addressee), a user name of the addressee, the name of the addressee, the mailing address of the addressee and/or a telephone number of the addressee. For example, the identification information is entered at least partially on the transmission device and/or selected (e.g. selected from an electronic address book) by the sender.

Associating the identification information with the key for decrypting the encrypted data object by the server is to be understood to meant, for example, that the server identifies the addressee from the identification information as a user registered with the server, and assigns (logically) to this registered user the key for decrypting the encrypted data object, and/or that the server assigns (logically) the identification information to the key for decrypting the encrypted data object.

For example, if the addressee can be identified as the registered user by the server using the identification information, the assignment may be stored in a entry associated with the addressee in a user database which is located in a memory of the server. If the addressee cannot be identified as a registered user by the server from the identification information, he may, for example, be invited by the server to register with the server. For example, the server may transmit or provide for transmission to the electronic message address of the addressee, to the mailing address of the addressee or to the telephone number of the addressee, a message with an invitation and instructions for registration with the server. For example, the server sends an e-mail to the e-mail address of the addressee with a link and/or activation code for registration with the server. However, other or additional registration steps are conceivable, such as performance of a PostIdent process.

On registration, the addressee provides, for example, registration information and/or receives, for example, registration information. For example, the registration information allows identification of the addressee by the server, authentication of the addressee by the server and/or contact with the addressee by the server. The registration information contains, for example, an electronic message address (e.g. an e-mail address or DE-mail address), an identification number (e.g. a customer number or registration number), a user name, a name, a mailing address, a telephone number, an authentication feature and/or a password. The registration information may be stored in a new entry associated with the addressee in the user database.

For example, the assignment may be stored in a corresponding entry in another database, such as a key database or identification information database, located in a memory of the server. This variant may also be implemented without registration of the addressee on the server, but is also conceivable in conjunction with registration of the addressee on the server. For example, the assignment may be stored in a corresponding entry in another database located in a memory of the server if the addressee cannot be identified as a registered user by the server using the identification information.

Sending the key for decrypting the encrypted data object by the server to the addressee is to be understood to mean, for example, that the key for decrypting the encrypted data object is sent to an electronic message address of the addressee, that the key is sent to a receiver device of the addressee, and/or that the key is transmitted in one or more data packets.

For example, the server sends the key for decrypting the encrypted data object in response to receiving a request for the key for decrypting the encrypted data packet at the server. This is advantageous, for example, in order to be able to carry out an authentication of the addressee before sending the key for decrypting the encrypted data object to the addressee.

It is, for example, also conceivable that the server sends the key for decrypting the encrypted data object periodically or immediately after generation of the key, for example in the form of a "push" transmission. For example, the key for decrypting the encrypted data object is sent to the addressee directly after generation or after a time delay following generation. For example, the key for decrypting the encrypted data object is sent to the addressee without the server having received a corresponding request. This is advantageous, for example, since the addressee obtains the key without request.

Providing by the server the key for decrypting the encrypted data object for retrieval by the addressee is to be understood to mean, for example, that the server provides the key for decrypting the encrypted data packet for download via a network, and/or that the server transmits the key for decrypting the encrypted data packet via a network to a download server (e.g. a download server of a Cloud service, such as Dropbox and Rapidshare), wherein the download server provides the key for decrypting the encrypted data packet for download via a network. For example, the server provides the key for decrypting the encrypted data object for retrieval by the addressee and sends an electronic message with a link for retrieval of the key for decrypting the encrypted data object to an electronic message address of the addressee.

For example, the key for decrypting the encrypted data object is sent by the server to the addressee or provided for retrieval by the addressee in encrypted form. For example, the key for decrypting the encrypted data object is sent to the receiver device of the addressee by the server or retrieved by the receiver device of the addressee in an HTTPS connection.

Only when the receiver device receives the key for decrypting the data object and stores this (temporarily) do the receiver device and addressee, for example, have knowledge of the key for decrypting the data object and can decrypt the encrypted data object. For example, neither the addressee nor the receiver device know the key for decrypting the encrypted data object at the time at which the data object is sent by the transmission device or provided for retrieval. For example, at the time at which the data object is sent or provided for retrieval, only the transmission device and/or the server have knowledge of the key for decrypting the encrypted data object. For example, neither the addressee nor the receiver device have knowledge of the key for decrypting the encrypted data object before a request for the key for decrypting the encrypted data object is sent to the server by the receiver device.

For example, the server is not involved in the sending or providing for retrieval of the encrypted data object. This is advantageous, for example, if the server knows the key for decrypting the encrypted data object, in order to ensure that the encrypted data object and the key for decrypting the encrypted data object are not present simultaneously in one entity on the transmission path from the transmission device to the receiver device.

For example, the encrypted data object is decrypted by the receiver device only for display and/or editing by the addressee. For example, then (i.e. after display and/or editing) it is re-encrypted by the receiver device and/or the decrypted data object is then deleted by the receiver device so that it is permanently stored on the receiver device only in encrypted form. This is advantageous, for example, to achieve protection of the data object on the receiver device.

Alternatively, however, it is also conceivable that the data object is decrypted by the receiver device, for example, and stored permanently decrypted in a memory of the receiver device. In this case, encrypting the data object only offers protection on the transmission path from the transmission device to the receiver device.

A server according to the invention comprises one or more means for performing the steps of the first method according to the invention. A transmission device according to the invention comprises one or more means for performing the steps of the second method according to the invention. A receiver device according to the invention comprises one or more means for performing the steps of the third method according to the invention.

For example, the server according to the invention, the transmission device according to the invention and the receiver device according to the invention are separate data processing systems which are configured in software and/or hardware to be able to perform the respective steps of the respective method according to the invention. Configured in software and/or hardware is to be understood to mean, for example, the preparation of the respective data processing system which is necessary to be able to perform the steps of a respective method, for example in the form of a computer program. Examples of a data processing system are a computer, a desktop computer, a portable computer such as a laptop computer, a tablet computer, a personal digital assistant, a Smartphone and/or a Thinclient.

For example, the server according to the invention, the transmission device according to the invention and/or the receiver device according to the invention each comprise means for executing one of the computer programs according to the invention, such as a processor. A processor is to be understood to mean, for example, a control unit, a microprocessor, a microcontrol unit such as a microcontroller, a digital signal processor (DSP), an application-specific integrated circuit (ASIC) or a field-programmable gate array (FPGA).

For example, the server according to the invention, the transmission device according to the invention and/or the receiver device according to the invention furthermore each comprise means for storage of information, such as a program memory and/or a main memory.

For example, the server according to the invention, the transmission device according to the invention and/or the receiver device according to the invention furthermore each comprise means for receiving and/or sending information over a network, such as a network interface. For example, the server according to the invention, the transmission device according to the invention and the receiver device according to the invention are and/or can be connected together via one or more networks.

For example, the server according to the invention comprises at least one processor and at least one memory with program instructions, wherein the at least one memory and the program instructions are configured in order, together with the at least one processor, to cause the server according to the invention to perform the steps of the first method according to the invention. For example, the transmission device according to the invention comprises at least one processor and at least one memory with program instructions, wherein the at least one memory and the program instructions are configured in order, together with the at least one processor, to cause the transmission device according to the invention to perform the steps of the second method according to the invention. For example, the receiver device according to the invention comprises at least one processor and at least one memory with program instructions, wherein the at least one memory and the program instructions are configured in order, together with the at least one processor, to cause the receiver device according to the invention to perform the steps of the third method according to the invention.

A system according to the invention for protected transmission of a data object comprises a server according to the invention, a transmission device according to the invention and a receiver device according to the invention.

The computer programs according to the invention comprise program instructions which cause a data processing system to perform at least one method according to the invention when one of the computer programs according to the invention is executed on the processor of the data processing system. A computer program may, for example, be distributed over a network. A computer program may be at least partially software and/or firmware of a processor.

The computer program according to the invention, which comprises program instructions which cause a data processing system to perform the second and/or third method according to the invention when the computer program according to the invention is executed on the processor of the data processing system, is, for example, formed as an application program (e.g. as an app or mobile app) or as a plug-in module for a messaging program such as an e-mail program. For example, such a computer program according to the invention is a proprietary computer program, for example a proprietary encryption and/or decryption program. Such a computer program according to the invention may, for example, be provided by the server for download via a network. Each data processing system which is to participate in the system according to the invention for protected transmission of a data object, as a transmission device and/or as a receiver device, may download such a computer program according to the invention from the server via the network.

The computer programs according to the invention may each be stored in a computer-readable storage medium which contains one or more computer programs according to the invention and e.g. is formed as a magnetic, electric, electromagnetic, optical and/or other storage medium. Such a computer-readable storage medium is, for example, formed as an object (i.e. "tangible"), for example as a data carrier device. Such a data carrier device is, for example, portable or fixedly installed in an apparatus. Examples of such a data carrier device are volatile or non-volatile memories with random access (RAM) such as e.g. NOR-Flash memory, or with sequential access such as NAND-Flash memory, and/or memories with read-only access (ROM) or write-read access. Computer-readable is to be understood to mean, for example, that the storage medium can be read and/or written by a computer or data processing system, for example by a processor.

In contrast to the prior art, according to exemplary embodiments of the present invention it is not necessary for the addressee and/or the receiver device to know the key for decrypting the encrypted data object before transmission or providing for transmission of the encrypted data object by the transmission device. According to the present invention, only the server need to know the key for decrypting the encrypted data object, so that the addressee and/or the receiver device may request the key for decrypting the encrypted data object by a corresponding request to the server.

This is advantageous, for example, since no special preparations need to be made by the addressee and receiver device to allow receiving and decrypting the encrypted data object. A user group, which uses the fourth method according to the invention for protected transmission of a data object, can thus very easily be expanded to include new users without having a central administration. Also a transmission device and/or a receiver device can very easily participate in the system according to the invention for protected transmission of a data object. Also the system according to the invention for protected transmission of a data object can very easily be integrated in an existing system, for example, merely by the addition of the server according to the invention to the existing system. The present invention therefore takes account of the circumstances of existing systems and methods for transmission of electronic messages and can very easily be integrated therein.

Exemplary embodiments of the present invention are explained below which depict further exemplary features of the method according to the invention, the computer programs according to the invention, the transmission device according to the invention, the receiver device according to the invention, the server according to the invention and the system according to the invention. In particular the description of an additional method step of one of the methods according to the invention also constitutes disclosure of means for performing the step of the transmission device according to the invention, the receiver device according to the invention or the server device according to the invention, and a corresponding program instruction of the corresponding computer program according to the invention which causes a data processing system to perform the method step when the computer program is executed by a processor of the data processing system. The same applies to the disclosure of the means for performing a method step or a program instruction, for example, disclosure of a means for performing a method step also constitutes disclosure of the corresponding method step and corresponding program instruction.

In exemplary embodiments of the invention, the key for decrypting the encrypted data object or a link for retrieval of the key for decrypting the encrypted data object is sent to an electronic message address of the addressee.

For example, the server provides the key for decrypting the encrypted data object for retrieval by the addressee, and sends an electronic message with a link for retrieval of the key for decrypting the encrypted data object to an electronic message address of the addressee (e.g. the electronic message address to which the encrypted data object is also sent). When the addressee retrieves his electronic messages using the receiver device, he can use the link to retrieve the key for decrypting the encrypted data object. This is advantageous, for example, to ensure that only persons who have access to the inbox of the electronic message address of the addressee can also retrieve the key for decrypting the encrypted data object.

For example, the key for decrypting the encrypted data object or the link for retrieval of the key for decrypting the encrypted data object, is sent to an electronic message address of the addressee which is contained in the identification information (e.g. the electronic message address of the addressee to which the encrypted data object is also sent). This is advantageous, for example, because the addressee receives the key for decrypting the encrypted the data object of the link for retrieval of the key for decrypting the encrypted data object on a known transmission path.

For example, the key for decrypting the encrypted data object or the link for retrieval of the key for decrypting the encrypted data object is sent to another electronic message address of the addressee than the encrypted data object. It is however also conceivable that both are transmitted to the same electronic message address.

For example, the key for decrypting the encrypted data object or the link for retrieval of the key for decrypting the encrypted data object is sent by the server from an electronic message address of the sender. For example, the key for decrypting the encrypted data object or the link for retrieval of the key for decrypting the encrypted data object is sent by the server from the same electronic message address as the encrypted data object. For example, the server, if e.g. it has no access to the outgoing mail server of the electronic message address of the sender, may use a so-called open relay (i.e. an outgoing mail server in which there is no need for authentication to send an electronic message address), in order to send the key for decrypting the encrypted data object or the link for retrieval of the key for decrypting the encrypted data object from an electronic message address of the sender to the electronic message address of the addressee. This is also known as "mail-spoofing". This is advantageous, for example, because the addressee receives the key for decrypting the encrypted data object or the link for retrieval of the key for decrypting the encrypted data object from an electronic message address of the sender (i.e. a trustworthy electronic message address known to him).

Alternatively, the key for decrypting the encrypted data object or the link for retrieval of the key for decrypting the encrypted data object is sent by the server from an electronic message address of the server. For example, the key for decrypting the encrypted data object or the link for retrieval of the key for decrypting the encrypted data object is sent by the server from an electronic message address which is configured specifically for sending such keys.

As described above, the server may send the key for decrypting the encrypted data object on the one hand, for example, in response to receiving a request for the key for decrypting the encrypted data packet at the electronic message address of the addressee. On the other hand, the server may send the key for decrypting the encrypted data object to the electronic message address of the addressee, for example, without request, immediately after generation or with a time delay following generation.

In exemplary embodiments of the invention, the first method according to the invention further comprises receiving a request for the key for decrypting the encrypted data object at the server, wherein the request for the key for decrypting the encrypted data object contains authentication information of the addressee, and the authenticating the addressee by the server; and the third method according to the invention furthermore comprises sending a request for the key for decrypting the encrypted data object with authentication information on an addressee of the encrypted data object from the receiver device to the server.

The request for the key for decrypting the encrypted data object of the first method according to the invention corresponds, for example, to the request for the key for decrypting the encrypted data object of the third method according to the invention. With the request for the key for decrypting the data object, the receiver device may request the key for decrypting the data object from the server. For example, the addressee may cause the receiver device to request the key for decrypting the data object from the server.

The request for the key for decrypting the data object comprises authentication information of the addressee. The authentication information, for example, contains an electronic message address (e.g. an e-mail address or DE-mail address), an identification number (e.g. a customer number or registration number), a user name, a name, a mailing address, a telephone number, an authentication feature and/or a password (e.g. a single-use password).

For example, the authentication information comprises at least information such as a user name and a password which are also contained in the registration information of the addressee registered on the server as a user. The server may authenticate the addressee by comparison of the authentication information with the registration information.

For example, the authentication information comprises at least information such as the name and mailing address of the addressee which are also contained in the identification information. The server may then authenticate the addressee by comparison of the authentication information with the identification information.

The authentication information may be entered at least partially on the receiver device by the addressee and/or read at least partially by the receiver device. For example, the addressee enters a user name and a password on the receiver device as authentication information. For example, the receiver device reads an authentication feature such as information from a Smartcard and/or a biometric feature as authentication information. A Smartcard is, for example, the electronic identification card of the addressee or a bank card. A biometric feature is, for example, the finger print of the addressee. This is advantageous, for example, in order to allow both a one-factor authentication and a two-factor authentication.

For example, the key for decrypting the encrypted data object may only be sent by the server to the receiver device or provided for retrieval when the addressee has been authenticated by the server.

In exemplary embodiments of the invention, the first method according to the invention further comprises generating the key for decrypting the encrypted data object by the server.

In exemplary embodiments of the invention, the first method according to the invention further comprises generating a key for encrypting the data object by the server, and sending the key for encrypting the data object by the server to the transmission device, or providing by the server the key for encrypting the data object for retrieval by the transmission device; and the second method according to the invention further comprises receiving the key for encrypting the data object from the server at the transmission device.

For example, the server generates both the key for encrypting the data object and the key for decrypting the data object (e.g. as an asymmetric key pair). This is advantageous amongst others since generation of the key takes place under the sole control of the server. For example, it can thus be ensured that the key meets certain minimum requirements such as key length and number of characters and symbols used.

For example, the server receives a request for the key for encrypting the data object from the transmission device. For example, the server generates the key for decrypting the encrypted data object and/or the key for encrypting the data object as soon as it receives such a request from the transmission device. Then the transmission device (or the sender) causes generating the key for encrypting the data object and/or the key for decrypting the encrypted data object.

For example, the key for encrypting the encrypted data object is sent by the server in encrypted form to the transmission device. For example, the key for encrypting the encrypted data object is sent from the server to the transmission device via a network in an HTTPS connection.

For example, the key for encrypting the data object and the key for decrypting the encrypted data object are the identical keys of a symmetric encryption method. An example of a symmetric encryption method is the AES encryption method. A symmetric encryption method is advantageous inter alia if a large quantity of data is to be encrypted, since it is faster.

For example, the key for encrypting the data object is a public key of an asymmetric encryption method, and the key for decrypting the encrypted data object is the corresponding private key of the asymmetric encryption method. An example of an asymmetric encryption method is the RSA encryption method and/or the elliptical curve cryptography encryption method. An asymmetric encryption method is advantageous amongst others if small data quantities are to be encrypted, since it is more difficult to attack (i.e. "hack") than a symmetric encryption method.

In exemplary embodiments of the invention, the second method according to the invention further comprises generating the key for decrypting and/or encrypting the data object by the transmission device, wherein the key for decrypting and/or encrypting the data object is sent to the server together with the identification information. For example, the transmission device generates both the key for encrypting the data object and the key for decrypting the encrypted data object. The key for encrypting the data object may then be certified by the server.

In exemplary embodiments of the invention, the first method according to the invention further comprises generating a certificate for the key for decrypting the encrypted data object by the server, and the sending to the addressee or providing for retrieval by the addressee the certificate for the key for decrypting the encrypted data object. For example, the certificate for the key for decrypting the encrypted data object is sent or provided for retrieval together with the key for decrypting the encrypted data object.

For example, the server is a server of an accredited certification centre (e.g. a trustworthy certification body). The certificate may confirm the (trustworthy) origin and/or authenticity of the key for decrypting the encrypted data object. For example, the certificate for the key for decrypting the encrypted data object is an X.509 certificate according to X.509 standard. An X.509 certificate is a public key certificate which, for example, confirms the identity of the holder and further properties of a public key. A detailed description of a possible technical embodiment of a public key infrastructure is given in the information brochure "Principles of Electronic Signature", by the Federal Office for Security in Information Technology (Bundesamt für Sicherheit in der Informationstechnik) 2006, in particular chapter 3.2 of this brochure. This is advantageous amongst others to prevent the key for decrypting the encrypted data object being substituted by an attacker on the transmission path from the server to the receiver device.

However embodiments are also conceivable in which the server does not generate a certificate for the key for decrypting the encrypted data object. For example, the key for decrypting the encrypted data object is sent by the server or provided for retrieval by the server without the server generating a certificate for the key for decrypting the encrypted data object.

In exemplary embodiments of the invention, the first method according to the invention further comprises generating a certificate for a key for encrypting the data object by the server, and sending the certificate for the key for encrypting the data object by the server to the transmission device; and the second method according to the invention comprises receiving a certificate for the key for encrypting the data object from the server at the transmission device.

For example the server is a server of an accredited certification centre (e.g. a trustworthy certification body). The certificate may confirm the (trustworthy) origin and/or authenticity of the key for encrypting the data object. For example, the certificate for the key for encrypting the data object is an X.509 certificate according to X.509 standard. This is advantageous amongst others to prevent the key for encrypting the data object being substituted by an attacker on the transmission path from the server to the transmission device.

For example, the certificate for the key for encrypting the data object is sent together with the key for encrypting the data object by the server to the transmission device. The transmission device may send the key for encrypting the encrypted data object together with the data object to the addressee or provide this for retrieval by the addressee.

For example, the request for the key for decrypting the encrypted data object contains the certificate for the key for encrypting the data object. It is however also conceivable that instead of the certificate, another unique feature is used such as a key number. This is advantageous, for example, to help the server to find the key for decrypting the data object.

For example, the server assigns (logically) the certificate for the key for encrypting the data object (or another unique feature) to the key for decrypting the encrypted data object, so that it can find the key for decrypting the encrypted data object using the certificate for the key for encrypting the data object (or the other unique feature). For example, this assignment may be stored in an entry in a database such as a key database located in a memory of the server.

However embodiments are also conceivable in which the server does not generate a certificate for the key for encrypting the data object. For example, the key for encrypting the data object is sent by the server or provided for retrieval by the server without the server generating a certificate for the key for encrypting the data object.

In exemplary embodiments of the invention, the second method according to the invention further comprises generating a digital signature for the data object by the transmission device.

For example, the digital signature is sent together with the encrypted data object by the transmission device to the addressee or provided for retrieval by the addressee. The addressee or the receiver device of the addressee may check the authenticity of the data object (e.g. the decrypted data object) using the digital signature.

For example, the digital signature contains an encrypted hash value of the data object which can be decrypted with the key for decrypting the encrypted data object. The hash value of the data object can be calculated via a hash function such as SHA-1. The transmission device may however generate a digital signature in a different manner. For example, the digital signature may be generated according to the PKCS#7 standard. A detailed description of a possible technical implementation of the generating and checking of a digital signature is given in the information brochure "Principles of Electronic Signature", Federal Office for Security in Information Technology (Bundesamt für Sicherheit in der Informationstechnik) 2006, in particular chapter 4 of this brochure.

In exemplary embodiments of the invention, the third method according to the invention further comprises removing the key for decrypting the encrypted data object from the receiver device. For example, the receiver device deletes the key for decrypting the encrypted data object after decrypting the encrypted data object, for example, immediately after decrypting and/or without user interaction. For example, the key for decrypting the encrypted data object must be requested afresh from the server before each decryption of the encrypted data object.

For example, the key for decrypting the encrypted data object is stored in a temporary folder in a memory of the receiver device. For example, only certain computer programs (e.g. the computer program according to the invention which comprises program instructions causing a data processing system to perform the second and/or third method according to the invention when the computer program according to the invention is executed on a processor of the data processing system) may access the temporary folder. For example, the temporary folder is located in a virtual data carrier in a main memory of the receiver device (e.g. in a so-called RAM disc or so-called RAM drive). The main memory of the receiver device may be a volatile memory.

This is advantageous, for example, in order to prevent the key for decrypting the encrypted data object from being stored permanently on the receiver device.

In exemplary embodiments of the invention, the third method according to the invention further comprises removing the decrypted data object from the receiver device. For example, the encrypted data object as described above is decrypted by the receiver device only for display and/or editing by the addressee. For example, it is then (e.g. immediately after display and/or editing) re-encrypted by the receiver device and/or the decrypted data object is then deleted by the receiver device.

For example, the decrypted data object is stored in a temporary folder on the receiver device. For example, only certain computer programs (e.g. the computer program according to the invention which comprises program instructions causing a data processing system to perform the second and/or third method according to the invention when the computer program according to the invention is executed on a processor of the data processing system) may access the temporary folder. For example, the temporary folder is located in a virtual data carrier in a main memory of the receiver device (e.g. in a so-called RAM disc or a so-called RAM drive). The main memory of the receiver device may be a volatile memory.

This is advantageous, for example, to ensure that the data object is stored permanently on the receiver device only in encrypted form. In conjunction with removing the key for decrypting the encrypted data object from the receiver device, it can thus also be ensured that the key for decrypting the encrypted data object must be requested afresh from the server whenever the addressee wishes to display and/or edit the data object (and the information contained therein).

In exemplary embodiments of the invention, the data object is a data object of a plurality of data objects.

For example, the encrypted data object is an encrypted data object of a plurality of encrypted data objects, wherein each of the encrypted data objects is sent or provided for retrieval by a transmission device from a plurality of transmission devices to an addressee of a plurality of addressees. For example, each transmission device of the plurality of the transmission devices sends or provides for retrieval at least one of the encrypted data objects of the plurality of encrypted data objects. For example, each addressee of a plurality of addresses causes the at least one encrypted data object of the plurality of encrypted data objects to be received on a receiver device of a plurality of receiver devices.

For example, each of the transmission devices of the plurality of transmission devices performs the steps of the second method according to the invention for at least one encrypted data object of the plurality of encrypted data objects and/or is configured to perform these steps, and, for example, each receiver device of the plurality of receiver devices performs the steps of the third method according to the invention for at least one encrypted data object of the plurality of encrypted data objects and/or is configured to perform these steps. For example, the server (i.e. for example, a single server) performs the steps of the first method according to the invention for each encrypted data object of the plurality of encrypted data objects and/or is configured to perform these steps.

For example, the server according to the invention comprises one or more means for executing the steps of the first method according to the invention for a plurality of encrypted data objects. For example, the transmission device according to the invention comprises one or more means for executing the steps of the second method according to the invention for a plurality of encrypted data objects. For example, the receiver device according to the invention comprises one or more means for executing the steps of the third method according to the invention for a plurality of encrypted data objects.

In exemplary embodiments of the invention, the key for decrypting the encrypted data object is a single-use key. A single-use key can, for example, only be used once for decrypting the encrypted data object. For example, the server sends the key for decrypting the encrypted data object only once, or provides this for retrieval only once. For example, the server then deletes the key for decrypting the encrypted data object. This is advantageous, for example, when the key for decrypting the encrypted data object must be requested afresh from the server before each decrypting the encrypted data object, in order to ensure that the encrypted data object can only be decrypted once.

In exemplary embodiments of the invention, only the encrypted data object is decryptable with the key for decrypting the encrypted data object. For example, no other encrypted data object can be decrypted with the key for decrypting the encrypted data object. This is advantageous amongst others to prevent an attacker, who has intercepted the key for decrypting the encrypted data object, from also being able to decrypt other encrypted data objects. In particular this increases the protection of the encrypted data object to be transmitted by a sender to an addressee. Because for each encrypted data object, the attacker must intercept the key for decrypting the respective encrypted data object.

In exemplary embodiments of the invention, the key for decrypting the encrypted data object has a predefined validity duration, wherein the key is sent to the addressee or provided for retrieval by the addressee by the server only if the server receives a request for the key within the predefined validity duration.

For example the server deletes the key for decrypting the encrypted data object immediately after expiry of the predefined validity duration. After expiry of the predefined validity duration, the key for decrypting the encrypted data object can no longer be retrieved from the server, so that decryption of the encrypted data object and hence access to the information contained therein is no longer possible. This is advantageous, for example, if the key for decrypting the encrypted data object must be requested from the server afresh before each decryption of the encrypted data object, in order to be able to predefine a "life" for the information contained in the encrypted data object.

In exemplary embodiments of the invention, the transmission of the encrypted data object comprises sending the encrypted object in an electronic message for the addressee of the data object, and the receiver device is an arbitrary data processing system with which the addressee retrieves and/or accesses the electronic message.

For example, the encrypted data object is part of an electronic message such as an attachment. Examples of an electronic message as described above are an e-mail, a DE-mail, a short message such as SMS and MMS, and/or a message sent via a so-called messenger service such as WhatsApp and Skype. For example, the electronic message is directed to a corresponding electronic message address of the addressee.

This is advantageous amongst others in order to be able to use an existing system or method for transmission of electronic messages for transmission of the encrypted data object. For example, the addressee may receive the encrypted data object via his normal e-mail address or normal DE-mail address without having to make special preparations for receiving in advance. The present invention as described above therefore takes account of the circumstances of existing systems and methods for transmission of electronic messages and can very easily be integrated therein.

For example, the receiver device is a data processing system which is configured to receive and/or retrieve the electronic message, and which the addressee uses to receive and/or retrieve the electronic message.

For example, the electronic message may also contain instructions and/or a link for registration and/or downloading the computer program according to the invention, which contains the program instructions causing the data processing system to perform the third method according to the invention when the computer program according to the invention is executed on a processor of the data processing system. As described above, this computer program may be configured as an application program (e.g. as an app or mobile app) or as a plug-in module for a messaging program such as an e-mail program.

In exemplary embodiments of the invention, the data object comprises one or more files, wherein the file format of the one or more files may be a portable document format (e.g. a PDF format), a message format (e.g. an EML format), a text processing document format (e.g. a TXT, DOC or XDOC format), a table calculation document format (e.g. an XLS or XLSX format), a data compression format (e.g. a ZIP or GZIP format) and/or a media file format (e.g. an AVI, MOV, MPEG or MP3 format).

In exemplary embodiments of the invention, the encrypted data object is configured as a file, wherein the file format of the encrypted data object is a proprietary data file format. For example, this proprietary file format is compatible with no known encryption file format, so it cannot be opened by any known encryption and decryption program. It may however be opened by a proprietary computer program such as a computer program according to the invention. This is advantageous, for example, to ensure that the addressee uses the computer program according to the invention (e.g. the proprietary encryption and/or decryption program) on the receiver device for display and/or editing of the information contained in the encrypted data object. Use of the computer program according to the invention on the receiver device can ensure that the encrypted data object is decrypted, for example, only for display and/or editing, and/or that the key for decrypting the encrypted data object is removed from the receiver device, for example, after decryption of the encrypted data object.

The encrypted data object may, for example, have a corresponding file name extension and/or a corresponding MIME type in order to indicate the proprietary file format. The computer program according to the invention (e.g. the proprietary encryption and/or decryption program) may be registered on the receiver device for opening files with such a file name extension and/or such a MIME type.

Furthermore, in the proprietary file format, conditions may be set for permitted and/or prohibited operations with the decrypted data object. For example, the sender may predefine corresponding settings on the transmission device.

For example, embodiments are also conceivable in which the encrypted data object is configured as a file, wherein the file format of the encrypted data object is a standard format, for example, a file format according to S/MIME standard, PGP standard and/or PKCS#7 standard. This is advantageous, for example, to achieve compatibility of the encrypted data object with the known encryption and/or decryption programs.

In exemplary embodiments of the invention, the key for decrypting the encrypted data object is configured as a file and has a corresponding file name extension and/or corresponding MIME type, in order to be identified as a key for decrypting the encrypted data object (e.g. to be identified as a key of the method according to the invention). The computer program according to the invention (e.g. the proprietary encryption and/or decryption program) may be registered to open files with such a file name extension and/or such a MIME type on the transmission and/or receiver device.

In an alternative embodiment of the invention, an alternative first method according to the invention comprises receiving at a server of a request for a key for decrypting the encrypted data object from a transmission device, generating the key for decrypting a data object by the server, and sending the key for decrypting the encrypted data object to the transmission device by the server, or providing by the server the key for decrypting the encrypted data object for retrieval by the transmission device.

In the alternative embodiment of the invention, an alternative second method according to the invention comprises sending a request for a key for decrypting an encrypted data object from a transmission device to a server, receiving the key for decrypting the encrypted data object from the server at the transmission device, encrypting the data object by the transmission device such that it is decryptable with the key for decrypting for the encrypted data object, and sending the encrypted data object and/or the key for decrypting the encrypted data object by the transmission device to an addressee, or providing by the transmission device the encrypted data object and/or the key for decrypting the encrypted data object for retrieval by the addressee.

In the alternative embodiment of the invention, an alternative third method according to the invention comprises obtaining the encrypted data object at a receiver device, receiving a key for decrypting the encrypted data object from a transmission device at the receiver device, and decrypting the encrypted data object by the receiver device.

In the alternative embodiment of the invention, an alternative fourth method according to the invention comprises the steps of the alternative first method according to the invention which run, for example, on a server, the steps of the alternative second method according to the invention which run, for example, on a transmission device, and the steps of the alternative third method according to the invention which run, for example, on a receiver device. The steps of the alternative first, alternative second and alternative third methods according to the invention should thus preferably be understood as corresponding steps of the alternative fourth method according to the invention for protected transmission of an encrypted data object, which, for example, can run in a system comprising the server, the transmission device and the receiver device.

In the alternative embodiment of the invention, an alternative server according to the invention comprises one or more means for performing the steps of the alternative first method according to the invention. In the alternative embodiment of the invention, an alternative transmission device according to the invention comprises one or more means for performing the steps of the alternative second method according to the invention. In the alternative embodiment of the invention, an alternative receiver device according to the invention comprises one or more means for performing the steps of the alternative third method according to the invention.

In the alternative embodiment of the invention, the alternative computer programs according to the invention comprise program instructions which cause a data processing system to perform at least one of the alternative methods according to the invention, when one of the alternative computer programs according to the invention is executed on a processor of the data processing system.

The alternative computer program according to the invention, which comprises program instructions causing a data processing system to perform the alternative second and/or third method according to the invention when the computer program according to the invention is executed on a processor of the data processing system, is, for example, configured as an application program (e.g. as an app or mobile app) or as a plug-in module for a messaging program such as an e-mail program. For example, such an alternative computer program according to the invention is a proprietary computer program, for example, a proprietary encryption and/or decryption program. Such an alternative computer program according to the invention may be provided, for example, by the server for download via a network. Any data processing system which is to participate in an alternative system according to the invention for protected transmission of a data object, as a transmission device and/or as a receiver device, may download such an alternative computer program according to the invention from the server via the network.

The difference between the alternative embodiment of the invention and the first, second, third and fourth methods according to the invention as described above lies in that, in the methods according to the invention for the alternative embodiment of the invention, the key for decrypting the encrypted data object is transmitted by the transmission device (and not by the server) to the receiver device. Apart from this difference, the features, definitions and exemplary embodiments described above in particular for the first, second, third and fourth methods according to the invention are to be understood also as disclosure of corresponding features, definitions and exemplary embodiments of the alternative first, second, third and fourth methods according to the invention for the alternative embodiment of the invention. In particular this applies to the encryption of the data object, the transmission of the encrypted data object by the transmission device to the receiver device, the generation of the key for decrypting the encrypted data object, and the generation of the key for encrypting the data object.

According to the alternative embodiment of the invention, the key for decrypting the encrypted data object may be sent by the transmission device to the addressee, or provided by the transmission device for retrieval by the addressee, either together with the encrypted data object or separately from the encrypted data object.

The key for decrypting the encrypted data object is, for example, transmitted temporally separately from the encrypted data object. For example, the key for decrypting the encrypted data object is sent to the addressee, or provided for retrieval by the addressee, before or after sending the encrypted data object, or before or after providing the encrypted data object for retrieval. Alternatively or additionally, the key for decrypting the encrypted data object is transmitted, for example, via a different transmission path than the encrypted data object.

Sending the key for decrypting the encrypted data object by the transmission device to the addressee is to be understood to mean, for example, that the key for decrypting the encrypted data object is sent to an electronic message address of the addressee, that the key is sent to a receiver device of the addressee, and/or that the key is transmitted in one or more data packets. For example, the key for decrypting the encrypted data object is sent to an electronic message address of the addressee (i.e. transmitted via a different transmission path than the encrypted data object). For example, the key for decrypting the encrypted data object is sent to a different electronic message address of the addressee than the encrypted data object. It is however also conceivable that both are transmitted to the same electronic message address. For example, the key for decrypting the encrypted data object is sent from an electronic message address of the sender. For example, the key for decrypting the encrypted data object is sent from the same electronic message address as the encrypted data object. This is advantageous, for example, because the addressee receives the key for decrypting the encrypted data object from the sender (i.e. from a message address in the known instance, e.g. an electronic message address known to the addressee).

Providing by the transmission device the key for decrypting the encrypted data object for retrieval by the addressee is to be understood to mean, for example, that the transmission device provides the key for decrypting the encrypted data object for download via a network, and/or that the transmission device transmits the key for decrypting the encrypted data packet via a network to a download server (e.g. a download server of a Cloud service such as Dropbox and Rapidshare), wherein the download server provides the key for decrypting the encrypted data packet for download via a network. For example, the key for decrypting the encrypted data object is transmitted to a different download server than the encrypted data object (i.e. transmitted via a different transmission path than the encrypted data object). It is however also conceivable that both are transmitted to the same download server.

For example, the key for decrypting the encrypted data object is sent to the addressee by the transmission device or provided for retrieval by the addressee in encrypted form. For example, the key for decrypting the encrypted data object is sent by the transmission device to the receiver device of the addressee or retrieved by the receiver device of the addressee in an HTTPS connection.

The exemplary embodiments of the present invention described above in this application are also understood to be disclosed in all combinations with each other.

Further advantageous exemplary embodiments of the invention are described in the following detailed description of some exemplary embodiments of the present invention, in particular in connection with the figures.

The figures attached to the application however serve only for the purpose of clarification, and not to determine the protective scope of the invention. The enclosed drawings are not to scale and therefore reflect merely the general concept of the present invention in exemplary form. In particular, features contained in the figures should in no way be deemed to be necessary constituents of the present invention.

DETAILED DESCRIPTION OF SOME EXEMPLARY EMBODIMENTS OF THE PRESENT INVENTION

The present invention is described below with reference to exemplary embodiments.

Figure 1:
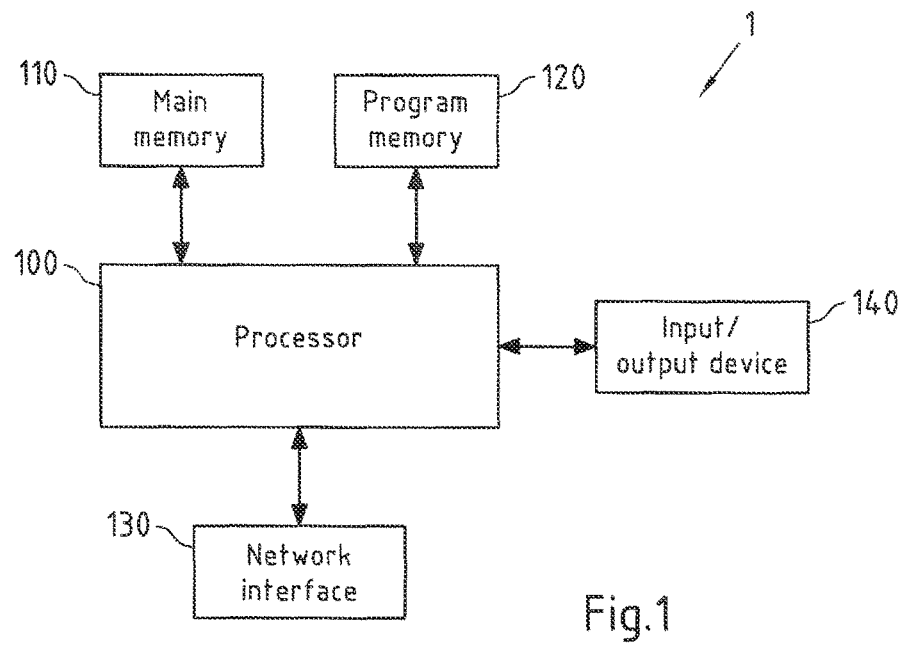
FIG. 1 is a block diagram of an exemplary embodiment of a data processing system.

FIG. 1 shows a block diagram of an exemplary embodiment of a data processing system 1. The data processing system 1 represents an exemplary embodiment of a server according to the invention, a transmission device according to the invention and/or a receiver device according to the invention.

The data processing system 1 may, for example, be a computer, a desktop computer, a portable computer such as a laptop computer, a tablet computer, a personal digital assistant, a Smartphone and/or a Thinclient.

The processor 100 of the data processing system 1 is in particular formed as a microprocessor, a microcontrol unit such as microcontroller, a digital signal processor (DSP), an application-specific integrated circuit (ASIC) or a field-programmable gate array (FPGA).

The processor 100 executes program instructions which are stored in the program memory 120, and, for example, stores the intermediate results or similar in a main memory 110. For example, program memory 120 is a non-volatile memory such as a flash memory, a magnetic memory, an EEPROM memory (electrically erasable programmable read-only memory) and/or an optical memory. The main memory 110 is, for example, a volatile or non-volatile memory, in particular a memory with random access (RAM) such as a static RAM memory (SRAM), a dynamic RAM memory (DRAM), a ferro-electric RAM memory (FeRAM) and/or a magnetic RAM memory (MRAM).

The program memory 120 is preferably a local data carrier which is fixedly connected to the data processing system 1. Data carriers which are fixedly connected to the data processing system 1 are, for example, hard disks integrated in a data processing system 1. Alternatively, the data carrier may also be a data carrier which can be separably connected to the data processing system 1, such as a memory stick, an interchangeable data carrier, a portable hard disk, a CD, a DVD and/or a diskette.

The program memory 120 contains the operating system of the data processing system 1 which is loaded at least partly into the main memory 110 on start-up of the data processing system 1, and executed by the processor 100. In particular, on start-up of the data processing system 1, at least part of the kernel of the operating system is loaded in the main memory 110 and executed by the processor 100. The operating system of the data processing system 1 is preferably a Windows, UNIX, Linux, Android, Apple iOS and/or MAC operating system.

The operating system allows the use of the data processing system 1 for data processing. It administers, for example, operating media such as the main memory 110 and program memory 120, network interface 130, input and output device 140, and—inter alia via program interfaces—makes fundamental functions available to other programs and controls the execution of programs.

The processor 100 controls the network interface 130, wherein the network interface 130 is controlled, for example, by a driver which is part of the core of the operating system. The network interface 130 is, for example, a network card, a network module and/or a modem, and is configured to establish a connection of the data processing system 1 to a network. The network interface 130 may, for example, receive data over the network and forward this to the processor 100, and/or receive data from the processor 100 and send this over the network. Examples of a network are a local area network (LAN) such as an Ethernet network or an IEEE 802 network, a wide area network (WAN), a wireless network, a hard-wired network, a mobile telephone network, a telephone network and/or the internet.

Furthermore, the processor 100 may control at least one input/output device 140. The input/output device 140 is, for example, a keyboard, a mouse, a display unit, a microphone, a touch-sensitive display unit, a speaker, a reader, a disc drive and/or a camera. The input/output device 140 may, for example, receive inputs from a user and forward these to processor 100, and/or receive and output information for the user from the processor 100.

Figure 2:
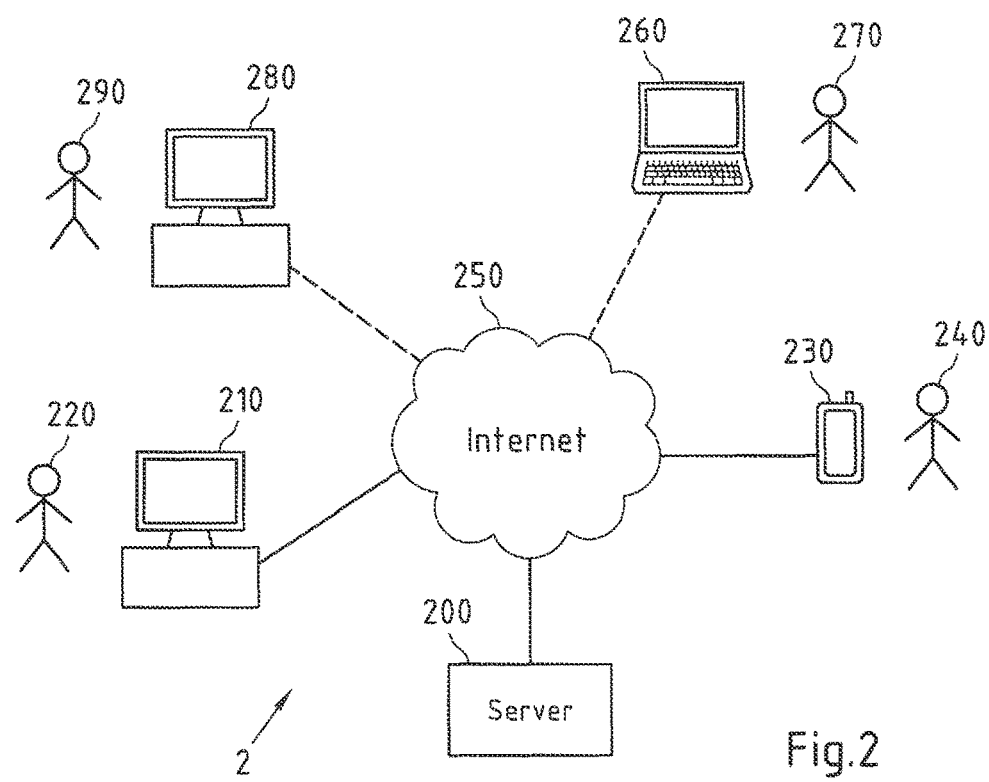
FIG. 2 is a block diagram of an exemplary embodiment of the system according to the invention.

FIG. 2 shows a block diagram of an exemplary embodiment of the system 2 according to the invention. The system 2 comprises a server 200, a desktop computer 210 and a Smartphone 230. Furthermore FIG. 2 depicts a user 220 of the desktop computer 210 and a user 240 of the Smartphone 230. The server 200, desktop computer 210 and Smartphone 230 correspond to the data processing system 1 (see FIG. 1) and are connected via their respective network interfaces to the internet 250 as an example of a network.

The server 200 is an example of a server according to the invention. For example, a computer program is installed on the server 200 which comprises program instructions causing the server 200 to perform the first method according to the invention when the computer program is executed on the processor of the server 200. The computer program may be stored in the program memory of the server 200. The server 200 is, for example, a server of a certification service provider.

The desktop computer 210 and Smartphone 230 are examples of transmission and/or receiver devices according to the invention. For example, a proprietary encryption and/or decryption program is installed on the desktop computer 210 and Smartphone 230, and comprises program instructions which cause the desktop computer 210 and Smartphone 230 to perform the second and/or third method according to the invention when the proprietary encryption and/or decryption program is executed on the processor of the desktop computer 210 and Smartphone 230.

The system 2 may comprise further data processing systems, for example laptop computer 260 with user 270, and desktop computer 280 with user 290. The laptop computer 260 and desktop computer 280 may also correspond to data processing system 1 and be connected to the internet 250 via their respective network interfaces.

The laptop computer 260 and desktop computer 280 are not transmission and/or receiver devices according to the invention. For example, the proprietary encryption and/or decryption program is not installed on the laptop computer 260 and desktop computer 280. However the server 200 may provide the proprietary encryption and/or decryption program for download over the internet so that these program(s) can be downloaded and installed on the laptop computer 260 and desktop computer 280. As a result, the laptop computer 260 and desktop computer 280 can easily become transmission and/or receiver devices according to the invention.

In the description which follows of FIGS. 3 to 6, it is assumed, for example, that an encrypted data object is to be sent in an e-mail from the desktop computer 210 to the addressee 240. The invention and also the exemplary embodiments of the method according to the invention described in FIGS. 3 to 6 are not however restricted to this, and may easily be used with other transmission and/or receiver devices and/or other transmission paths. Consequently, in the description which follows, the desktop computer 210 serves as an example of a transmission device according to the invention, the user 220 as an example of the sender of the encrypted data object, the Smartphone 230 as an example of a receiver device according to the invention, the user 240 as an example of the addressee of the data object, and the server 200 as an example of a server according to the invention.

Figure 3:
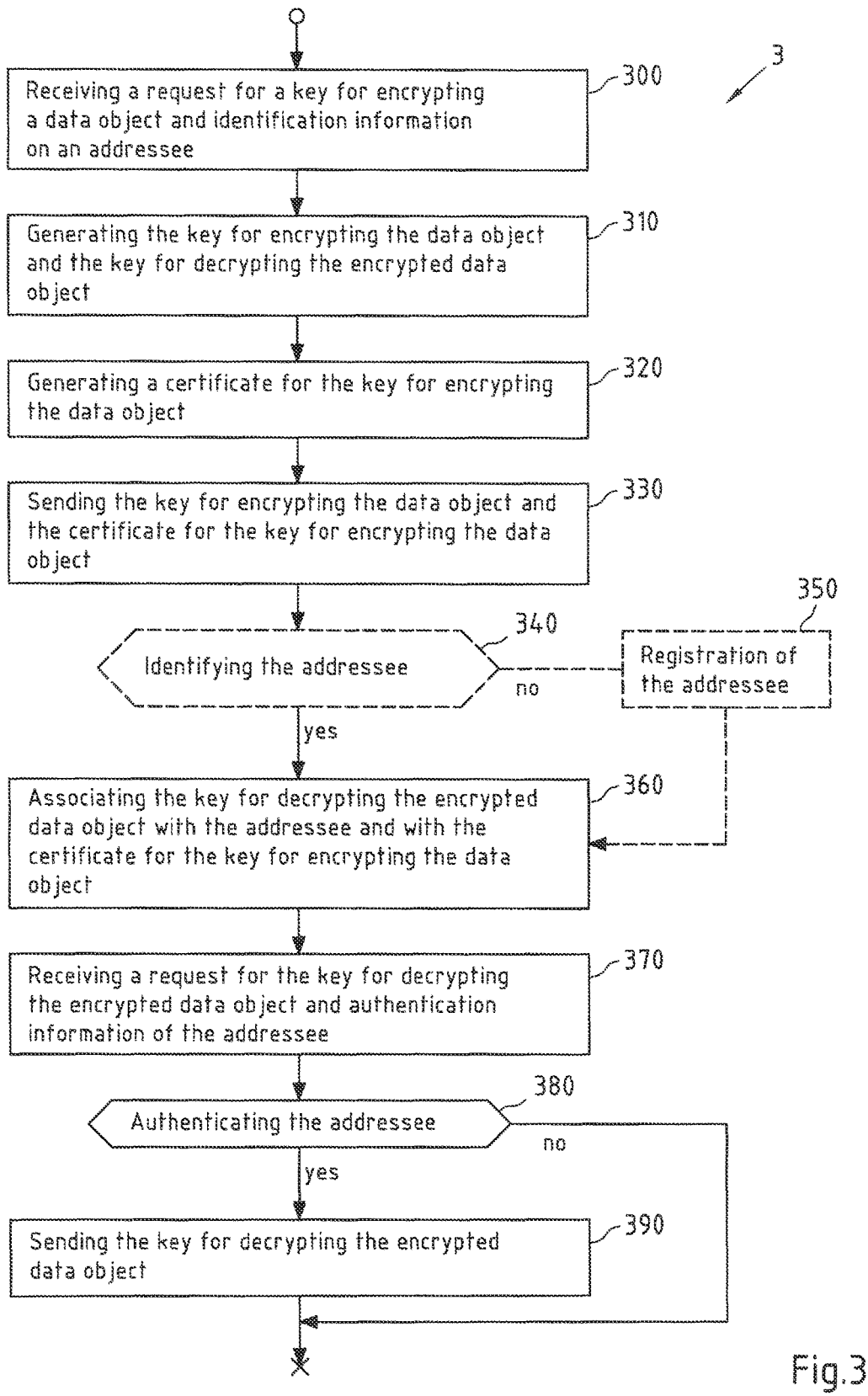
FIG. 3 is a flow diagram with steps of an exemplary embodiment of the first method according to the invention.

FIG. 3 shows a flow diagram 3 with steps of an exemplary embodiment of the first method according to the invention, which runs on the server 200 every time an encrypted data object is sent by a transmission device such as the desktop computer 210 to an addressee or is to be provided for retrieval by the addressee.

In step 300, the server 200 receives from the desktop computer 210 a request for the key for encrypting the data object and identification information on the addressee 240. For example, the server 200 receives the request for the key for encrypting the data object and the identification information via a network interface with which it is connected to the internet 250.

The request for the key for encrypting the data object may contain a predefined validity duration for a key for decrypting the encrypted data object. The predefined validity duration may be entered and/or selected by the sender 220 on the desktop computer 210.

The identification information contains, for example, an electronic message address of the addressee (e.g. an e-mail address or DE-mail address of the addressee), an identification number of the addressee (e.g. a customer number or a registration number of the addressee), a user name of the addressee, the name of the addressee, the mailing address of the addressee and/or a telephone number of the addressee. The identification information may be entered and/or selected by the sender on the desktop computer 210.

In step 310, the server 200 generates the key for encrypting the data object and the key for decrypting the encrypted data object. For example, the key for encrypting the data object is a public key of an asymmetric encryption method, and the key for decrypting the encrypted data object is the corresponding private key of the asymmetric encryption method. As described above, the key may alternatively also be produced by the transmission device.

For example, the server 200 generates the key for encrypting the data object and the key for decrypting the encrypted data object in response to the request for the key for encrypting the data object. It is however also conceivable that the server has already generated the key for encrypting the data object and the key for decrypting the encrypted data object, before receiving the request for the key for encrypting the data object.

The server 200 may save the key for decrypting the encrypted data object and the key for encrypting the data object in an entry in a key database, which is located, for example, in the program memory of the server 200. If the request for the key for encrypting the data object contains a predefined validity duration for the key for decrypting the encrypted data object, this validity duration may also be saved in the entry in the key database. Otherwise a standard value for the validity duration, or no validity duration, may be stored in the entry.

In step 320, the server 200 generates a certificate for the key for encrypting the data object. For example, the server 200 is a server of an accredited certification point. The certificate may be an X.509 certificate and confirm the (trustworthy) origin and/or authenticity of the key for encrypting the data object.

The server 200 may store the certificate for the key for encrypting the data object in the same entry in the key database in which the key for decrypting the encrypted data object and the key for encrypting the data object are stored. This facilitates finding of the key for decrypting the encrypted data object.

In step 330, the server 200 sends the key for encrypting the data object and the certificate for the key for encrypting the data object to the desktop computer 210. For example, the server sends the key for encrypting the data object and the certificate for the key for encrypting the data object to the desktop computer 210 via the network interface with which it is connected to the internet 250. Alternatively, the server 200 may provide the key for encrypting the data object, for example, for download by the desktop computer 210.

In an optional step 340, the server 200 checks whether it can identify the addressee 220 from the identification information.

For example, the server 200 checks whether it can identify the addressee as a registered user.

For example, the program memory of the server 200 contains a user database with entries for all users registered with the server 200 or with the certification service provider. In each entry associated with a registered user, the user database contains registration information on the respective user, for example, an electronic message address (e.g. an e-mail address or DE-mail address), an identification number (e.g. a customer number or registration number), a user name, a name, a mailing address, a telephone number, an authentication feature and/or a password. By comparing the identification information with the entries stored in the user database, the server 200 may check whether it can identify the addressee 240 as a registered user from the identification information.

If the identification information contains an e-mail address of the addressee, the server 200 may search in the user database for an entry in which this e-mail address is saved as registration information on the user associated with the entry. The server 200 identifies the user associated with this entry as the addressee 240 of the encrypted data object.

If the server 200 can identify the addressee 240 (e.g. if it can identify the addressee as a registered user), it performs the step 360. Otherwise it performs the next step 350.

In an optional step 350, the server 200 invites the addressee 240 to register with the server 200. For example, the server may transmit a message, or provide this for transmission, to the electronic message address of the addressee, to the mailing address of the addressee or to the telephone number of the addressee, with an invitation and instructions for registration with the server.

If the identification information contains an e-mail address of the addressee, the server 200 may in the optional step 350 send to this e-mail address of the addressee an e-mail with a link and/or an activation code for registration with the server 200. For example, the server 200 provides a website for registration with the server 200. The addressee 240 can access the website via the link in the e-mail.

For example, in the optional step 350 the addressee 240 accesses this website from the Smartphone 230. The website may invite the addressee 240 to enter the activation code and further registration information to register with the server 200. For example the website may invite the addressee 240 to enter at least one e-mail address, a user name and a password as registration information. Then the server 200 may store the registration information entered by the addressee in a new entry associated with the addressee in the user database.

In step 360, the server 200 associates the key for decrypting the encrypted data object with the addressee 240 and with the certificate for the key for encrypting the data object.

For example, the server stores a reference to the entry associated with the addressee in the user database, in the entry in the key database in which the key for decrypting the encrypted data object and the certificate for the key for encrypting the data object are stored.

If the optional steps 340 and 350 are not performed, in step 360 the server may, for example, store the identification information fully or partly in the entry in the key database in which the key for decrypting the encrypted data object and the certificate for the key for the encrypting the data object are stored.

In step 370, the server 200 receives a request for the key for decrypting the encrypted data object and authentication information of the addressee 240 from the Smartphone 230. For example, the server 200 receives the request for the key for decrypting the encrypted data object and the authentication information of the addressee 240 via the network interface with which it is connected to the internet 250.

The request for the key for decrypting the encrypted data object may contain the certificate for the key for encrypting the data object.

The authentication information contains, for example, an electronic message address (e.g. an e-mail address or DE-mail address), an identification number (e.g. a customer number or a registration number), a user name, a name, a mailing address, a telephone number, an authentication feature and/or a password. The authentication information may be entered by the addressee 240 on the Smartphone 230.

In step 380, the server 200 checks whether it can authenticate the addressee 240 from the authentication information.

For example, the server 200 may check, by comparison of the authentication information with the entry stored in the user database and/or the key database, whether it can authenticate the addressee 240 from the authentication information.

For example, the server 200 may look in the key database for the entry in which the certificate for the key for encrypting the data object is stored.

If this entry contains a validity duration, the server 200 checks whether the request for the key for decrypting the encrypted data object was received within the validity duration. If the request for the key for decrypting the encrypted data object was received within the validity duration, the server 200 continues the method. Otherwise it interrupts this and, for example, outputs a corresponding error message.

If this entry contains a reference to the entry associated with the addressee 240 in the user database, the server may then check whether the authentication information corresponds to the registration information contained in this entry in the user database. If the authentication information contains a user name and a password, the server checks, for example, whether the user name and the password correspond to the user name and password in the entry associated with the addressee in the user database. The server authenticates the addressee if a correlation exists.

If the entry in the key database contains identification information, the server may then check whether the authentication information corresponds to the identification information contained in this entry in the key database. If the authentication information contains an e-mail address, the server checks, for example, whether the e-mail address corresponds to an e-mail address contained in the identification information. The server authenticates the addressee if a correlation exists.

If the server 200 authenticates the addressee 240, it performs the step 390. Otherwise it ends the method and, for example, outputs an error message.

In step 390, the server 200 sends the key for decrypting the encrypted data object to the Smartphone 230. For example, the server sends the key for decrypting the data object to the Smartphone 230 via the network interface with which it is connected to the internet 250. For example, the server sends the key for decrypting the encrypted data object via an encrypted HTTPS connection. Alternatively the server 200 may provide the key for decrypting the data object for download, and, for example, sends the addressee 240 an e-mail with a link for downloading the key.

As described above, variants are also conceivable in which the server 200 "pushes" the key for decrypting the data object to the Smartphone 230 (i.e. for example, after generating, sends this to the Smartphone 230 without a request for the key for decrypting the encrypted data object first being received at the server 200). Such a variant is conceivable, for example, as an alternative to steps 370 to 390.

In another variant, which is conceivable, for example, as an alternative to steps 340 to 390, the server provides the key for decrypting the encrypted data object for retrieval by the addressee, and sends an electronic message with a link for retrieval of the key for decrypting the encrypted data object to an electronic message address of the addressee (e.g. to an electronic message address contained in the identification information). When the addressee retrieves his electronic messages with the receiver device, he can use the link to retrieve the key for decrypting the encrypted data object. The key for decrypting the encrypting the data object may, for example, be formed as a file, and have a corresponding file name extension and/or corresponding MIME type in order to be identified as a key of the method according to the invention.

Figure 4:
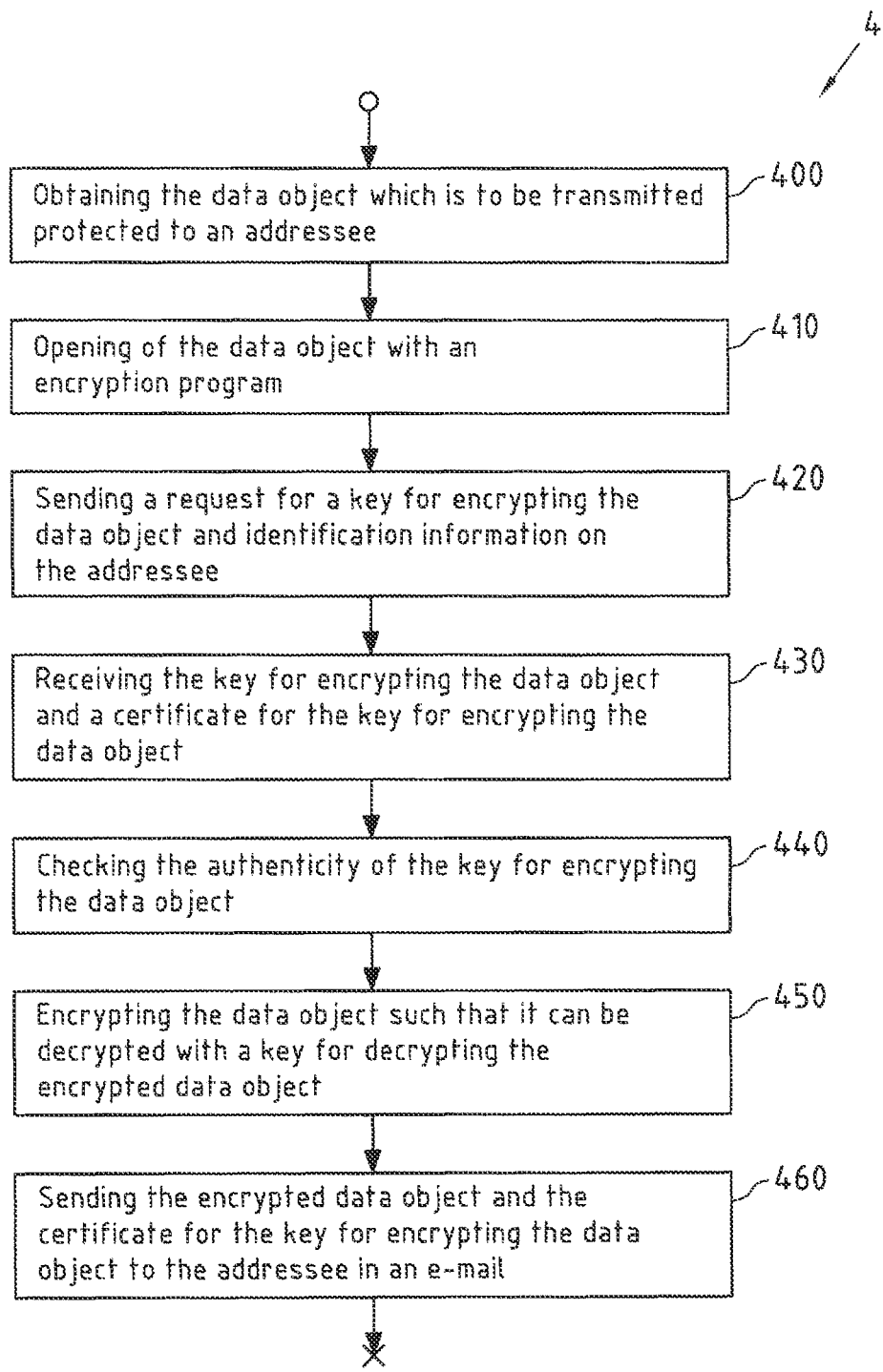
FIG. 4 is a flow diagram with steps of an exemplary embodiment of the second method according to the invention.

FIG. 4 shows a flow diagram 4 with steps of an exemplary embodiment of the second method according to the invention, which runs on a transmission device such as the desktop computer 210 when an encrypted data object is to be sent by the transmission device to a receiver device such as the Smartphone 230, or provided for retrieval.

In step 400, the desktop computer 210 receives the data object which is to be transmitted in protected form to an addressee. For example, the desktop computer 210 receives the data object by input of the sender 220 in an input/output device of the desktop computer 210. Preferably, the data object is a message (where applicable with one or more attachments) which the sender 220 wishes to transmit in protected form to the addressee 240.

The data object may contain one or more files, which, for example, may be one or more files with a portable document format (e.g. PDF format), a message format (e.g. EML format), a text processing document format (e.g. a DOC or XDOC format), a table calculation document format (e.g. an XLS or XLSX format), a data compression format (e.g. ZIP or GZIP format), and/or a media file format (e.g. AVI, MOV, MPEG or MP3 format).

In step 410, the desktop computer 210 opens the data object with a program such as an encryption program (e.g. a proprietary encryption program). For example, the sender 220 causes the desktop computer 210 to run the encryption program on the processor of the desktop computer 210 and open the data object with this. It is however also conceivable that the encryption program runs on the processor of the desktop computer 210. The encryption program may contain program instructions which cause the desktop computer 210 to perform at least steps 420 to 450 when it is executed on the processor of the desktop computer 210.

In step 420, the desktop computer 210 sends a request for a key for encrypting the data object and identification information on the addressee to the server 200. For example, the desktop computer 210 sends the request for a key for encrypting the data object and the identification information to the server 200 over the network interface with which it is connected to the internet 250.

The request for a key for encrypting the data object may contain a predefined validity period for a key for decrypting the encrypted data object. For example, the encryption program invites the sender to enter and/or select a validity duration for the key for decrypting the encrypted data object at an input/output device of the desktop computer 210.

As already described above, the identification information contains, for example, an electronic message address of the addressee (e.g. an e-mail address or DE-mail address of the addressee), an identification number of the addressee (e.g. a customer number or registration number of the addressee), a user name of the addressee, the name of the addressee, the mailing address of the addressee and/or a telephone number of the addressee.

For example, the encryption program invites the sender to enter and/or select the identification information on an input/output device of the desktop computer 210. For example, the encryption program invites the sender to enter at least one electronic message address of the addressee and/or select this from an electronic address book.

In step 430, the desktop computer 210 receives the key for encrypting the data object and a certificate for the key for encrypting the data object from the server 200. For example, the desktop computer 210 receives the key for encrypting the data object and the certificate for the key for encrypting the data object via the network interface with which it is connected to the interface 250.

For example, the encryption program saves the key for encrypting the data object and the certificate for the key for encrypting in a temporary folder in the program memory of the desktop computer 210.

In step 440, the desktop computer 210 checks the validity of the key for encrypting the data object against the certificate.

In step 450, the desktop computer 210 encrypts the data object with the key for encrypting the data object. If the key for encrypting the data object is a public key of an asymmetric encryption method, the desktop computer 210 encrypts the data object, for example, according to this encryption method.

After encrypting the data object with the key for encrypting the data object, the desktop computer 210 may delete the key for encrypting the data object. In this way it can, for example, be ensured that no further data object is encrypted with the key.

The encrypted data object may be formed as a file, wherein the file format of the encrypted data object may, for example, be a proprietary file format. The encrypted data object may have a corresponding file name extension and/or corresponding MIME type to indicate the proprietary file format.

In step 460, the desktop computer 210 sends the encrypted data object and the certificate for the key for encrypting the data object to the addressee 240 in an e-mail. For example, the desktop computer 210 sends the e-mail via the network interface with which it is connected to the internet 250 to an outgoing mail server of an e-mail service, such as an SMTP server.

For example, the encrypted data object is part of the e-mail. For example, the encrypted data object is attached to the e-mail.

The encryption program may contain program instructions which cause the desktop computer 210 to perform step 460 when it is executed on the processor of the desktop computer 210. It is however also conceivable that the user causes the desktop computer 210 to perform step 460 by input at an input/output device of the desktop computer 210, for example by corresponding inputs in an e-mail program.

As described above, however, other transmission paths for the encrypted data object are conceivable. For example, the desktop computer 210 may transmit the encrypted data object to a download server of a Cloud service such as, for example, Dropbox, wherein the download server provides the encrypted data object for downloading.

Figure 5:
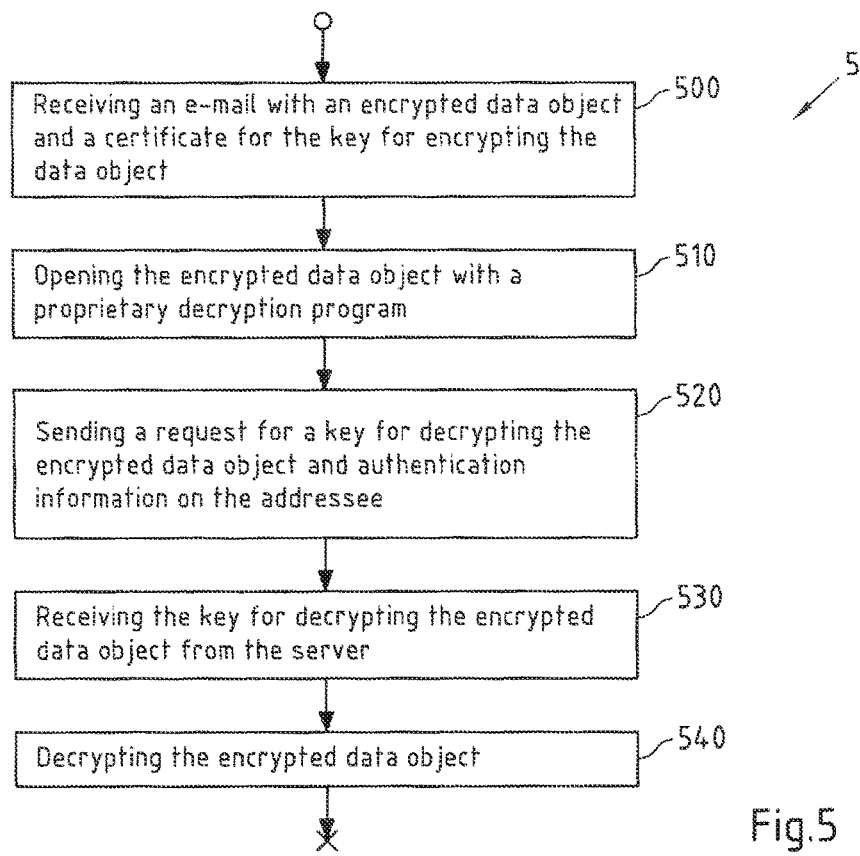
FIG. 5 is a flow diagram with steps of an exemplary embodiment of the third method according to the invention.

FIG. 5 shows a flow diagram 5 with steps of an exemplary embodiment of the third method according to the invention, which run on a receiver device such as a Smartphone 230 when an encrypted data object is to be transmitted to the receiver device or provided for transmission by a transmission device such as the desktop computer 210.

In step 500, the Smartphone 230 receives an e-mail with the encrypted data object and a certificate for a key for encrypting the data object. For example, the Smartphone 230 receives the e-mail with the encrypted data object and the certificate for the key for encrypting the data object via the network interface with which it is connected to the internet 250.

For example, the Smartphone 230 retrieves the e-mail via the network interface with which it is connected to the internet 250 from an incoming mail server of an e-mail service, such as a POP3 server.

For example, the encrypted data object is part of the e-mail. For example the encrypted data object is attached to the e-mail.

For example, the addressee 240 causes the Smartphone 230 to perform step 500 by inputs at an input/output device of the Smartphone 230, for example by corresponding inputs in an e-mail program.

In step 510, the Smartphone 230 opens the encrypted data object with a program such as decryption program (e.g. a proprietary decryption program). For example, the addressee 240 causes the Smartphone 230 to execute the decryption program on the processor of the Smartphone 230 and open the encrypted data object with this. If the encrypted data object is formed as a file and has a proprietary file format, the proprietary decryption program may be registered with the operating system of the Smartphone 230 as the standard program for opening the encrypted file program.

The proprietary decryption program may contain program instructions which cause the Smartphone 230 to perform at least steps 520 to 540 when it is executed on the processor of the Smartphone 230.

In step 520, the Smartphone 230 sends a request for a key for decrypting the encrypted data object and authentication information of the addressee 240. For example, the Smartphone 230 sends to the server 200 the request for the key for decrypting the encrypted data object and the authentication information of the addressee 240 over the network interface with which it is connected to the internet 250.

The request for the key for decrypting the encrypted data object may contain the certificate for the key for encrypting the data object.

The authentication information as described above contains, for example, an electronic message address (e.g. an e-mail address or DE-mail address), an identification number (e.g. a customer number or registration number), a user name, a name, a mailing address, a telephone number, an authentication feature and/or a password.

For example, the decryption program invites the addressee 240 to enter the authentication information on the input/output device of the Smartphone 230 or provide this for reading. For example, the decryption program invites the addressee 240 to enter at least one user name and password. Alternatively or additionally, the decryption program may invite the addressee 240 to enter an authentication feature such as information from a Smartcard and/or a biometric feature as authentication information for reading at the input/output device of the Smartphone 230.

In step 530, the Smartphone 230 receives the key for decrypting the encrypted data object from the server 200. For example, the Smartphone 230 receives the key for decrypting the encrypted data object via the network interface with which it is connected to the internet 250. For example, it receives the key for decrypting the encrypted data object via an encrypted HTTPS connection.

For example, the decryption program stores the key for decrypting the encrypted data object in a temporary folder in the program memory of the Smartphone 230 or in a temporary folder in a virtual data carrier in the main memory of the Smartphone (e.g. in a so-called RAM disc or RAM drive). For example, only the decryption program may access the temporary folder.

In step 540, the Smartphone 230 decrypts the encrypted data object and provides the decrypted data object for the addressee 240 for display on an output device of the Smartphone 230 and/or for editing via an input/output device of the Smartphone 230. For example, the decryption program stores the decrypted data object in a temporary folder in the program memory of the Smartphone 230 or in a temporary folder in a virtual data carrier in the main memory of the Smartphone (e.g. in a so-called RAM disc or RAM drive).

For example, only the decryption program and/or the predefined program may access the temporary folder.

The decryption program may contain program instructions which cause the Smartphone 230, when the decryption program is executed on the processor of the Smartphone and the addressee 240 wishes to end either the display and/or the editing of the decrypted data object or end the decryption program, to delete the key for decrypting the encrypted data object and the decrypted data object from the Smartphone 230. When the addressee wishes to display and/or edit the decrypted data object again, steps 500 to 540 must be performed again.

Figure 6:
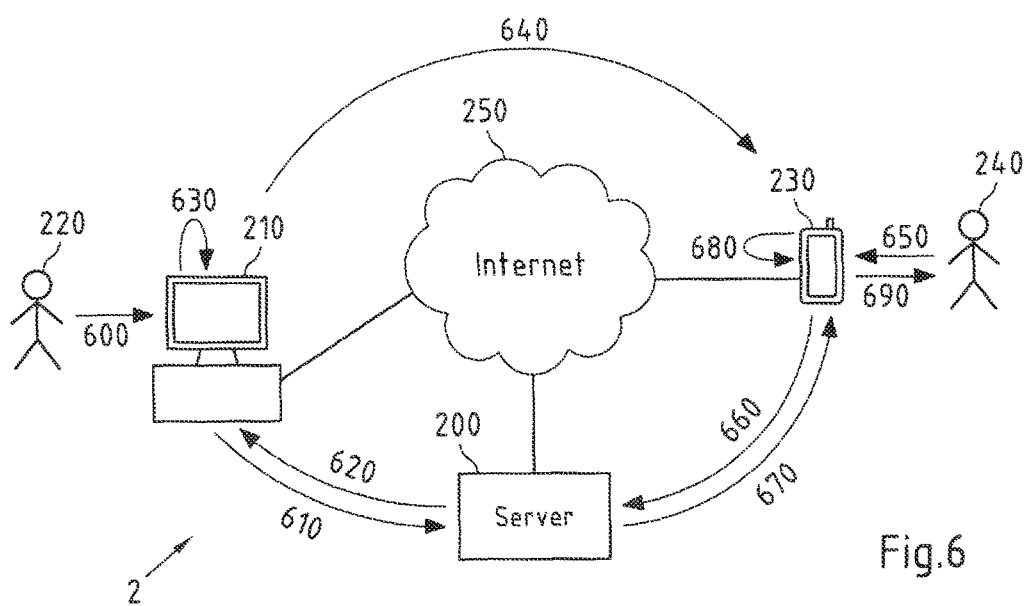
FIG. 6 is a block diagram of an exemplary embodiment of the system according to the invention with exemplary steps of the fourth method according to the invention.

FIG. 6 shows a block diagram of an exemplary embodiment of the system 2 according to the invention with exemplary steps of the fourth method according to the invention.

The sender 220 wishes to send an encrypted message to the addressee 240. The addressee 240 is to be able to receive the encrypted message from the sender 220 and decrypt it. Communication is to take place via the e-mail addresses of the participants. E-mail is currently the most commonly used communication form and most users are familiar with it.

In a first step 600, the sender 220 uses a dedicated application such as an encryption program for encrypting and sending the message to the addressee. This application may also be a plug-in to an existing e-mail client or a browser. The encryption program, as described above, is executed on a processor of the desktop computer 210.

In step 610, the encryption program connects to the server 200 of the certification service provider. In step 610, for example, the request for a key for encrypting the data object and the identification information on the addressee 240 is transmitted from the desktop computer 210 (see step 420 above) to the server 200 (see step 300 above).

In response to the request, the server generates an asymmetric key pair (e.g. for the RSA encryption method and/or the elliptical curve cryptography encryption method) for the addressee (see step 310 above). Also the server of the certification service provider may produce a certificate for the public key of the new key pair (see step 320 above).

In a step 620, the key for encrypting the data object (i.e. the new public key of the new key pair) and the certificate for the key for encrypting the data object are sent by the server 200 (see step 330) to the desktop computer 210 (see step 430).

In step 630, the application receives the key for encrypting the data object and uses this to encrypt the message.

The encrypted message is, for example, formed as a file and may have a file name extension or MIME type so that it can be recognised as a message or file of the method according to the invention. Also other mechanisms are conceivable as long as the encrypted message or encrypted file can be identified as a message or file of the method according to the invention.

In a step 640, the encrypted message is sent together with the certificate or another unique feature of the certificate to the addressee 240 as an attachment to an e-mail (see step 460 above), so that the server 200 can provide the key belonging to the message. The e-mail itself may contain corresponding information and links to the application which is required for decrypting the encrypted message.

In step 650, the e-mail attachment may be opened automatically with the application such as a decryption program (see step 510 above), if the addressee 240 already has this program and is registered with the operating system of the Smartphone 230 for opening messages encrypted with the method according to the invention. In principle, this works both for conventional computer operating systems and for all known Smartphone operating systems.

If the addressee 240 does not yet have the decryption program and is not registered with the server 200, in step 650 the addressee may download the decryption program, for example, via the link in the email on the Smartphone 230. On installation, the decryption program may be registered automatically with the operating system of the Smartphone 230 for the file name extension or MIME type concerned.

Also the addressee is registered with the certification service provider or server 200 of the certification service provider (see step 350 above). In the simplest case, this registration may take place via the e-mail address of the addressee, for example, the addressee 240 on registration selects a user name and password with the certification service and then receives a message from the certification service provider which confirms the registration.

After the start of the application, the application may invite the addressee 240 to enter certain user data such as the user name and password as authentication information.

In a step 660, the application logs on to the server 200 of the certification service with the authentication information of the addressee 240, and retrieves the new private key and certificate after authenticating the addressee 240 by the server 200 (see step 380 above). For example, in step 660, the request for the key for decrypting the encrypted data object and the authentication information of the addressee 240 are transmitted by the Smartphone 230 (see step 520) to the server 200 (see step 370).

In a step 670, the key for decrypting the encrypted data object is transmitted by the server 200 (see step 390) to the Smartphone 230 (see step 530).

In step 680, the application decrypts the encrypted message so that the addressee 240 can view the message in step 690. On closure of the application, the private key is deleted from the device.

The present invention allows the sending and receiving of cryptographically secured data over the internet, even for open user groups, in a manner which is transparent and simple. It is however also suitable for closed user groups, such as user groups wishing to use heterogeneous technologies such as mobile and non-mobile devices. Also security is increased since the certificate and the key pair are used for only one encrypted message.

Since the private key must be retrieved each time, the reading of the message may be limited in time. The associated private key is simply no longer issued by the certification service provider (or its server) or is deleted. The certification service provider which produces the key may then only read the message if it intercepts this en route from A to B. The message should therefore not be sent to the certification service provider or via a service it offers.

For delivering the message, Cloud memories may be used, in particular if these are very large.

User groups which securely operate their own certification services are largely safe from interception by third parties.

The certificate simplifies the finding of the correct key for decryption.

Existing standards, implementations and their security assessments may be used for all technologies used in the method according to the invention. They are therefore easy to implement and evaluate in terms of security.

Variants of the method according to the invention are conceivable in which the key is produced by the encryption program, the certificate however is still issued by the certification service provider who also carries out the identification or authentication of the addressee.

Also, the methods according to the invention can be used for digital signatures.

The encrypted message may also contain conditions under which operations may be carried out with the decrypted message, for example, View only or View and Forward, but not Save. The decryption program used for decryption and display may implement these conditions accordingly.

The sequence of the individual method steps in the individual flow diagrams is not mandatory; unless specified otherwise, alternative sequences of method steps are conceivable. The method steps may be implemented in various ways, hence implementation is conceivable in software (by program instructions), hardware or a combination of the two for implementation of the method steps.

The exemplary embodiments of the present invention described in this specification are also disclosed in all combinations with each other. In particular, in the present case, the description of a feature comprised by one embodiment should not—unless explicitly declared otherwise—be understood to mean that the feature is essential or mandatory for the function of the exemplary embodiment. The sequence of the method steps outlined in this specification in the individual flow diagrams is not compulsory; alternative sequences of the method steps are conceivable. The method steps may be implemented in various ways, so implementation in software (by program instructions), hardware or a combination of the two to implement the method steps is conceivable. Terms used in the patent claims such as "comprise", "have", "contain" or "include" and similar do not exclude further elements or steps. The wording "at least partially" covers both the case "partially" and the case "completely". The wording "and/or" covers both the case "and" and the case "or". A plurality of units, persons or similar in this context of the specification means several units, persons or similar. The use of the indefinite article does not exclude a plurality. An individual device may perform the functions of several units or devices cited in the claims. Reference numerals given in the claims should not be regarded as restrictions of the means and steps used.

The invention claimed is:

1. Method comprising
receiving identification information on an addressee to whom an encrypted data object is sent by a transmission device or for whom the encrypted data object is to be provided by the transmission device for retrieval, from the transmission device to a server,
associating the identification information with a key for decrypting the encrypted data object by the server,
generating a certificate for a key for encrypting the data object by the server, wherein the server assigns the certificate for the key for encrypting the data object to the key for decrypting the encrypted data object,
sending the certificate for the key for encrypting the data object to the transmission device, and
sending the key for decrypting the encrypted data object to the addressee by the server, or providing by the server the key for decrypting the encrypted data object for retrieval by the addressee;
wherein the server stores the assignment between the certificate for the key for encrypting the data object and the key for decrypting the encrypted data object in an entry in a database located in a memory of the server; and
wherein the certificate for the key for encrypting the data object and the key for decrypting the encrypted data object are stored in the entry in the database, and wherein the server deletes the key for decrypting the encrypted data object after the sending or providing.

2. Method according to claim 1, wherein the key for decrypting the encrypted data object or a link for retrieving the key for decrypting the encrypted data object is sent to an electronic message address of the addressee.

3. Method according to claim 1, further comprising:
receiving a request for the key for decrypting the encrypted data object at the server, wherein the request comprises authentication information of the addressee, authenticating the addressee by the server.

4. Method according to claim 3, wherein the key for decrypting the encrypted data object has a predefined validity duration, and wherein the key is sent to the addressee or provided for retrieval by the addressee by the server only when the server receives the request for the key within the predefined validity duration.

5. Method according to claim 3, wherein the request for the key for decrypting the encrypted data object contains the certificate for the key for encrypting the data object.

6. Method according to claim 1, further comprising:
generating the key for decrypting the encrypted data object by the server.

7. Method according to claim 1, further comprising:
generating the key for encrypting the data object by the server, and
sending the key for encrypting the data object from the server to the transmission device, or providing by the server the key for encrypting the data object for retrieval by the transmission device.

8. Method according to claim 7, wherein the key for encrypting the data object is a public key of an asymmetric encryption method, and wherein the key for decrypting the encrypted data object is a corresponding private key of the asymmetric encryption method.

9. Method according to claim 1, wherein the key for decrypting the encrypted data object is a single-use key and/or wherein only the encrypted data object is decryptable with the key for decrypting the encrypted data object.

10. Server comprising: at least one processor and at least one memory with program instructions, wherein the at least one memory and the program instructions are configured in order, together with the at least one processor, to cause the server to perform the steps of the method according to claim 1.

11. Non-transitory computer-readable storage medium with a computer program comprising:
program instructions which cause a data processing system to perform the steps of the method according to claim 1 when the computer program is executed on a processor of the data processing system.

12. Method comprising:
encrypting a data object by a transmission device such that it can be decrypted with a key for decrypting the encrypted data object,
sending identification information on an addressee of the encrypted data object by the transmission device to a server,
receiving a certificate for the key for encrypting the data object from the server at the transmission device, and
sending the encrypted data object by the transmission device to the addressee or providing by the transmission device the encrypted data object for retrieval by the addressee, wherein the certificate is sent to the addressee or provided for retrieval by the addressee together with the encrypted data object;
wherein the server stores an assignment between the certificate for the key for encrypting the data object and the key for decrypting the encrypted data object in an entry in a database located in a memory of the server; and
wherein the certificate for the key for encrypting the data object and the key for decrypting the encrypted data object are stored in the entry in the database, and wherein the server deletes the key for decrypting the encrypted data object after the sending or providing.

13. Method according to claim 12, furthermore comprising:
receiving the key for encrypting the data object from the server at the transmission device, or
generating the key for decrypting and/or encrypting the data object by the transmission device, wherein the key for encrypting and/or decrypting the data object is sent to the server together with the identification information.

14. Method according to claim 12, further comprising:
generating a digital signature for the data object by the transmission device.

15. Method according to claim 12, wherein sending the encrypted data object comprises sending the encrypted data object in an electronic message for the addressee of the data object, and wherein the receiver device is an arbitrary data processing system with which the addressee retrieves the electronic message and/or accesses the electronic message.

16. Method according to claim 12, wherein the data object comprises one or more files and wherein the file format of the one or more files is a portable document format, a message format, a text processing document format, a table calculation document format, a data compression format and/or media file format.

17. Method according to claim 12, wherein the encrypted data object is configured as a file and wherein the file format of the encrypted data object is a proprietary file format.

18. Transmission device comprising:
at least one processor and at least one memory with program instructions, wherein the
at least one memory and the program instructions are configured in order, together with the at least one processor, to cause the transmission device to perform the steps of the method according to claim 12.

19. Non-transitory computer-readable storage medium with a computer program comprising: program instructions which cause a data processing system to perform the steps of the method according to claim 12 when the computer program is executed on a processor of the data processing system.

20. Method comprising:
obtaining an encrypted data object together with an certificate for a key for encrypting the data object at a receiver device,
sending a request for a key for decrypting the encrypted data object with authentication information on an addressee of the encrypted data object from the receiver device to a server, wherein the request for the key for decrypting the encrypted data object contains the certificate for the key for encrypting the data object,
receiving the key for decrypting the encrypted data object from the server at the receiver device, and
decrypting the encrypted data object by the receiver device;
wherein the server stores an assignment between the certificate for the key for encrypting the data object and the key for decrypting the encrypted data object in an entry in a database located in a memory of the server; and wherein the certificate for the key for encrypting the data object and the key for decrypting the encrypted data object are stored in the entry in the database, and wherein the server deletes the key for decrypting the encrypted data object after the sending.

21. Method according to claim 20, further comprising: removing by the receiver device the key for decrypting the encrypted data object from the receiver device.

22. Receiver device comprising:
at least one processor and at least one memory with program instructions, wherein the at least one memory and the program instructions are configured in order, together with the at least one processor, to cause the receiver device to perform the steps of the method according to claim 20.

23. Computer-readable storage medium with a computer program comprising;
program instructions which cause a data processing system to perform the steps of the method according to claim 12 when the computer program is executed on a processor of the data processing system.

24. Method for protected transmission of a data object, the method comprising;
receiving identification information on an addressee to whom an encrypted data object is sent by a transmission device or for whom the encrypted data object is to be provided by the transmission device for retrieval, from the transmission device at a server,
associating the identification information with a key for decrypting the encrypted data object by the server,
generating a certificate for a key for encrypting the data object by the server, wherein the server assigns the certificate for the key for encrypting the data object to the key for decrypting the encrypted data object,
sending the certificate for the key for encrypting the data object to the transmission device,
sending the key for decrypting the encrypted data object to the addressee by the server, or providing by the server the key for decrypting the encrypted data object for retrieval by the addressee;
encrypting the data object by the transmission device such that it can be decrypted with the key for decrypting the encrypted data object,
sending the identification information on the addressee of the encrypted data object by the transmission device to the server,
receiving the certificate for the key for encrypting the data object from the server at the transmission device,
sending the encrypted data object by the transmission device to the addressee or providing by the transmission device the encrypted data object for retrieval by the addressee, wherein the certificate is sent to the addressee or provided for retrieval by the addressee together with the encrypted data object;
obtaining the encrypted data object together with the certificate for the key for encrypting the data object at a receiver device;
sending a request for the key for decrypting the encrypted data object with authentication information on the addressee of the encrypted data object from the receiver device to the server, wherein the request for the key for decrypting the encrypted data object contains the certificate for the key for encrypting the data object,
receiving the key for decrypting the encrypted data object from a server at the receiver device, and
decrypting the encrypted data object by the receiver device;
wherein the server stores the assignment between the certificate for the key for encrypting the data object and the key for decrypting the encrypted data object in an entry in a database located in a memory of the server; and
wherein the certificate for the key for encrypting the data object and the key for decrypting the encrypted data object are stored in the entry in the database, and wherein the server deletes the key for decrypting the encrypted data object after the sending or providing.

25. System for protected transmission of a data object, the system comprising:
a server comprising at least one hardware processor and at least one memory with program instructions stored therein, wherein the at least one memory and the program instructions are configured in order, executed by the at least one hardware processor, to cause the server to perform:—receiving identification information on an addressee to whom an encrypted data object is sent by a transmission device or for whom the encrypted data object is to be provided by the transmission device for retrieval, from the transmission device to a server,
associating the identification information with a key for decrypting the encrypted data object,
generating a certificate for a key for encrypting the data object by the server, wherein the server assigns the certificate for the key for encrypting the data object to the key for decrypting the encrypted data object,
sending the certificate for the key for encrypting the data object to the transmission device, and
sending the key for decrypting the encrypted data object to the addressee, or providing the key for decrypting the encrypted data object for retrieval by the addressee;
the transmission device comprising: at least one processor and at least one memory with program instructions, wherein the at least one memory and the program instructions are configured in order, together with the at least one processor, to cause the transmission device to perform:
encrypting the data object such that it can be decrypted with the key for decrypting the encrypted data object,
sending identification information on the addressee of the encrypted data object to the server,
receiving the certificate for the key for encrypting the data object from the server, and
sending the encrypted data object to the addressee or providing the encrypted data object for retrieval by the addressee, wherein the certificate is sent to the addressee or provided for retrieval by the addressee together with the encrypted data object; and
a receiver device comprising at least one processor and at least one memory with program instructions, wherein the at least one memory and the program instructions are configured in order, together with the at least one processor, to cause the receiver device to perform:
obtaining the encrypted data object together with the certificate for a key for encrypting the data object,
sending a request for the key for decrypting the encrypted data object with the authentication information on the addressee of the encrypted data object to the server, wherein the request for the key for decrypting the encrypted data object contains the certificate for the key for encrypting the data object,
receiving the key for decrypting the encrypted data object from the server, and
decrypting the encrypted data object.

* * * * *

UNITED STATES PATENT AND TRADEMARK OFFICE
CERTIFICATE OF CORRECTION

| | | |
|---|---|---|
| PATENT NO. | : 10,039,001 B2 | Page 1 of 1 |
| APPLICATION NO. | : 14/591993 | |
| DATED | : July 31, 2018 | |
| INVENTOR(S) | : Ismet Koyun et al. | |

It is certified that error appears in the above-identified patent and that said Letters Patent is hereby corrected as shown below:

In the Specification

Column 12, Line 15, delete the word "encrypted"

Signed and Sealed this
Twenty-fifth Day of September, 2018

Andrei Iancu
*Director of the United States Patent and Trademark Office*